Figure 1:
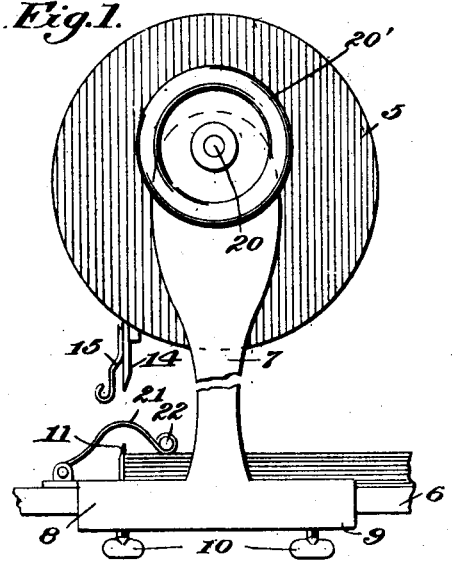

May 21, 1929.  E. LEBOVITZ  1,714,382

CLOTH CUTTER

Filed Aug. 12, 1927

Inventor:
Edward Lebovitz,
By
Attÿ.

Patented May 21, 1929.

1,714,382

UNITED STATES PATENT OFFICE.

EDWARD LEBOVITZ, OF BROOKLYN, NEW YORK.

CLOTH CUTTER.

Application filed August 12, 1927. Serial No. 212,485.

This invention relates to a cloth cutter, having particular reference to cutters to be associated with a cutting or laying out table for manipulation with sheet or stripped goods.

The primary object of the invention is to provide a cloth cutter capable of being easily and quickly applied to or removed from a suitable base, such as a cutting table, adjusted properly thereon, to accurately measure and sever the cloth operated upon, and which is positive in its operations.

A further object of the invention is to provide a cutter involving the use of improved mechanism for carrying out the severing operation, which includes clamping or holding means for piled cloth, and which is equipped with means for preventing cloth being measured from coming into contact with cutting edges of the mechanism.

A still further object is to provide means for facilitating the shearing action and for properly tensioning the cloth upon the cutting blades throughout the cutting operation.

The invention is adapted particularly for use in connection with a cloth clamping means such as disclosed in my co-pending application executed concurrently herewith and Serial No. 212,486.

With these objects in view, together with others which will appear as the description proceeds, the invention consists in the novel construction, combination and arrangement of parts, all as will be described more fully hereinafter, illustrated in the drawings and particularly pointed out in the claim.

In the drawings:—

Figure 2:
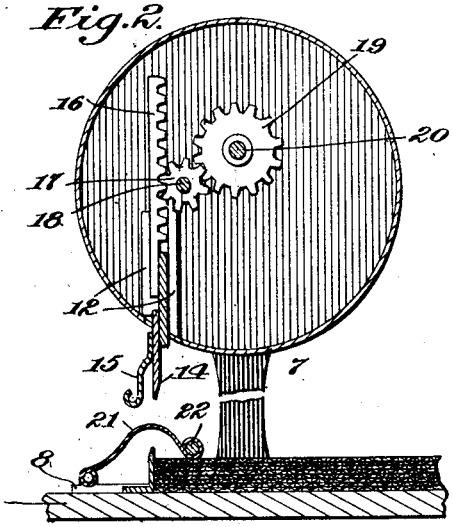
Figure 4:
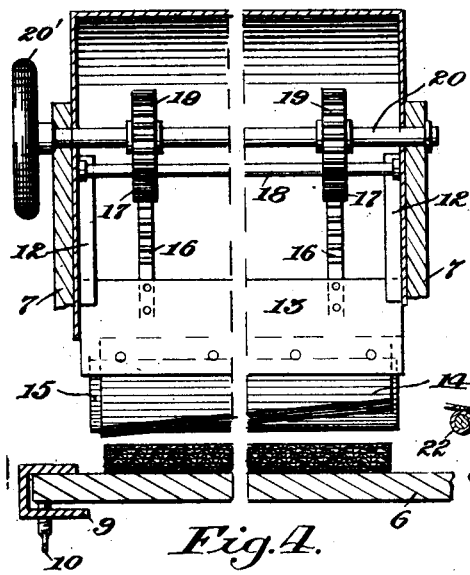
Figure 3:
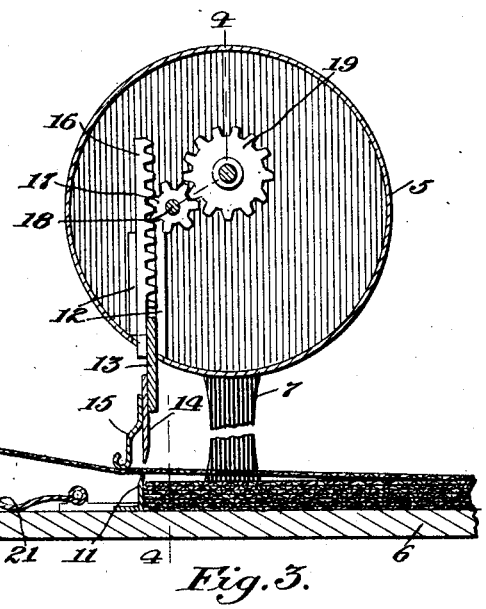

Fig. 1 is a side elevation of a cloth cutter constructed in accordance with the invention and shown as applied to a suitable cutting or laying out table, Fig. 2 is a vertical transverse sectional view taken through the cutter shown in Fig. 1, Fig. 3 is a view similar to Fig. 2 and showing changed positions of the parts, and Fig. 4 is a sectional view taken substantially upon line 4—4 of Fig. 3.

The cloth cutter of my invention comprises a cylindrical drum represented at 5 and comprising part of the cutter frame. This drum is hollow and is preferably formed of thin sheet metal, being supported in proper elevation above the base or table 6 by standards or legs 7. The drum will be of a length corresponding to or slightly greater than the breadth of the cloth with which it is to be used. The standards or legs 7 are provided at their lower ends with laterally directed feet 8 to assist in stabilizing the frame, and depending from one of the standards is a bracket structure including inturned feet 9 through which clamp screws 10 are threaded for securely holding the frame upon the table 6.

Secured at its ends to opposing feet 8 is an upwardly projecting knife 11 upon which the cloth is to be severed.

Arranged within the drum 5 and in proper alignment upon the end walls or heads thereof are spaced vertically disposed guides 12 within which the ends of a blade carrier 13 slidably engage. This carrier or support has secured at its lower part a blade 14 so positioned as to perform shearing action upon the fixed knife 11. Secured to the blade 14 and disposed slightly rearwardly thereof is a tensioning or stretcher plate 15, the lower edge of which is blunted or rolled as shown and disposed slightly below the lower or cutting edge of blade 14. The blade and stretcher plate are so arranged that they straddle the fixed blade 11 when the knife is lowered.

Secured in upstanding position to the member 13 and in spaced relation within the drum 5 are rack bars 16 in mesh with the teeth of pinions 17 carried upon a stub shaft 18 disposed longitudinally within the drum, and these pinions are in mesh with gears 19 carried by a shaft 20 disposed within the drum longitudinally thereof. One end of this shaft projects beyond an end of the drum and is equipped with a hand wheel 20' by means of which the shaft may be rotated.

Secured at its ends to opposing feet 8 of the standard 7 and rearwardly of the fixed knife 11 is a guard 21. This guard may be formed of thin sheet metal and is pivotally secured to the feet as shown so as to be capable of moving over or away from the knife 11 as required. To adapt itself to the shape of a blade and to obviate coming in contact therewith, the guard may be concaved longitudinally as shown. The free end of this guard is rolled and weighted as shown at 22, so as to form a rest for cloth being fed through the cutter when in one position, and to operate as a weight to hold the cloth when in another position.

In operation, the frame having first been securely fixed to the table, the hand wheel 20' is rotated so as to elevate the cutter blade. The guard 21 is then swung to the position shown in Figs. 1 and 2, whereupon the cloth to be cut is fed through the machine and the free edge thereof anchored or secured properly positioned upon the table. With the guard still in the position shown in Figs. 1 and 2, the cloth may be straightened and smoothed out preparatory to the cutting operation, whereupon the guard 21 is swung rearwardly to the position substantially as shown in Fig. 3. When thus positioned, the knife is uncovered, whereupon rotation of the hand wheel 20' in the proper direction will cause the blade 14 to descend to perform shearing action with the fixed knife 11. The stretcher plate, however, immediately precedes the cutting edge of blade 14, whereupon the cloth is properly stretched upon the fixed knife 11, thus facilitating cutting of the cloth and preventing wadding or jamming. When this cutting operation is complete, the hand wheel is rotated in such direction as to elevate the cutting blade, whereupon guard 21 is thrown over to the position shown in Figs. 1 and 2. The weighted end 22 will firmly hold the adjacent edge of the sheet or strip already cut, while the concave portion of the guard prevents the next strip coming in contact with the knife during the operation of feeding the same through the machine. These operations may continue until sufficient layers have been cut, whereupon they will be removed or further operated upon as desired.

From the foregoing it is apparent that I have provided a cloth measuring and cutting machine of extremely simple nature and yet the use of which insures rapid and accurate workmanship. It is understood, of course, that the cutter will be positioned upon the cutting table an accurate distance from the end holding clamp to insure a proper length cut of the goods operated upon. By the use of such machine, danger of improper cuts is obviated, and the hands and arms of workmen are protected against being cut or injured.

Having thus described my invention, I claim:—

In a cloth cutter, a frame, a knife fixed to said frame, a blade carried by said frame and movable to cooperate in cutting action with said knife, a guard pivotally carried by said frame and adapted to swing over said knife, and a weight on the free end of said guard to rest upon and hold a fabric when the guard is disposed over said knife.

In testimony whereof I affix my signature.

EDWARD LEBOVITZ.